United States Patent [19]

Canzano et al.

[11] Patent Number: 5,117,999

[45] Date of Patent: Jun. 2, 1992

[54] LOW PRESSURE RELIEF VALVE FOR FIXED AND MOVABLE SYSTEMS

[76] Inventors: Pasquale S. Canzano, 31 Candlewicke Dr., Dover, Del. 19901; Brock J. Vinton, P.O. Box 85, Montchanin, Del. 19710

[21] Appl. No.: 511,919

[22] Filed: Apr. 18, 1990

Related U.S. Application Data

[63] Continuation-in-part of Ser. No. 296,206, Jan. 12, 1989, abandoned.

[51] Int. Cl.⁵ .............................................. B65D 51/16
[52] U.S. Cl. ...................................... 220/209; 220/203; 220/367; 220/371; 220/89.1; 215/260; 215/261; 215/311
[58] Field of Search ............... 220/203, 229, 367, 209, 220/371, 89.1, DIG. 27; 137/843, 844, 845, 849, 851, 860; 215/260, 261, 311; 383/103; 229/DIG. 14

[56] References Cited

U.S. PATENT DOCUMENTS

| 670,794 | 3/1901 | Lott | 220/86 AT |
|---|---|---|---|
| 2,394,333 | 2/1946 | Schneider | 220/367 |
| 2,486,364 | 10/1949 | Simmons | |
| 3,179,301 | 4/1965 | Lucht | |
| 3,244,318 | 3/1969 | Berryman et al. | 229/DIG. 14 |
| 3,432,087 | 3/1969 | Costello | 383/103 |
| 3,525,357 | 8/1970 | Koreski | 137/849 |
| 3,696,958 | 10/1972 | Lee | 215/261 |
| 3,930,096 | 12/1975 | Gilpatrick | 137/843 |
| 3,951,293 | 4/1976 | Schulz | 215/261 |
| 3,964,509 | 6/1976 | Daubenberger et al. | |
| 4,492,253 | 1/1985 | Raftis | 137/849 |
| 4,620,648 | 11/1986 | Schwartzman | |
| 4,799,598 | 1/1989 | McFadyen | 220/367 |
| 4,872,678 | 10/1989 | Coons | 137/844 |

FOREIGN PATENT DOCUMENTS

| 118830 | 8/1944 | Australia | 137/849 |
|---|---|---|---|
| 1122068 | 8/1956 | France | 220/203 |
| 784017 | 10/1957 | United Kingdom | 220/367 |
| 1354691 | 5/1974 | United Kingdom | 137/844 |
| 2137972 | 10/1984 | United Kingdom | 220/203 |

Primary Examiner—Stephen Marcus
Assistant Examiner—Stephen Cronin
Attorney, Agent, or Firm—John C. Andrade

[57] ABSTRACT

A low pressure relief valve made of elastomeric material is capable of relieving pressure in fixed and movable systems and is both economical and reliable.

12 Claims, 2 Drawing Sheets

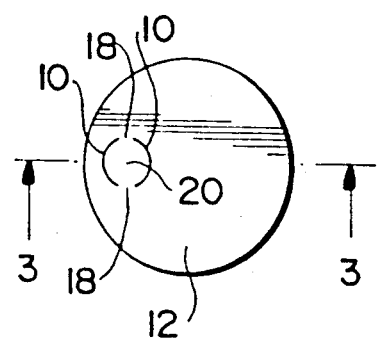
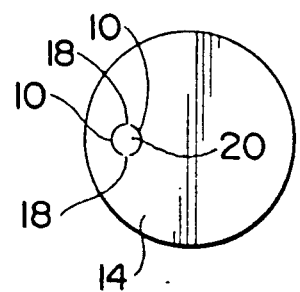
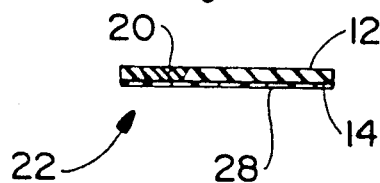
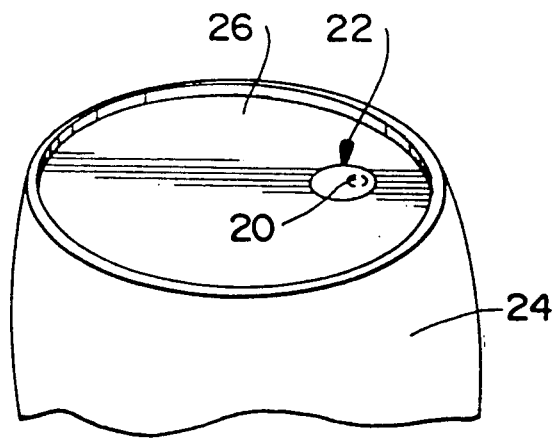

LOW PRESSURE RELIEF VALVE FOR FIXED AND MOVABLE SYSTEMS

CROSS REFERENCE TO RELATED APPLICATION

This Application is a continuation-in-part of application Ser. No. 296,206, filed Jan. 12, 1989.

BACKGROUND

This invention relates to a relief valve which provides for safe protection of such systems while allowing for their proper operation. More particularly it relates to a low pressure relief valve of elastomeric material and a method for relieving pressure in low pressure systems.

The use of a resilient, elastic and somewhat flexible material in the formation of the valve structure of a cap to a bottle or jar is disclosed in U.S. Pat. No. 2,486,364 and a self-disclosing dispensing head of resilient material for tubes and resilient containers in disclosed in U.S. Pat. No. 3,179,301.

U.S. Pat. No. 4,620,648 discloses a pressure response valve which includes an elastically deformable diaphragm having a plurality of non-intersecting non-meeting separate arcuate slits, each slit having a base which is intersected by at least one other slit, and each slit being out of intersecting relation with its own base. The disclosed valve controls flow, especially of viscous fluids but does not control pressure. The disclosed valve operates by deflection of the deformable diaphragm in response to an outer directed force. This deflection causes a rotation of one portion of the diaphragm relative to the other portion of the diaphragm as it moves outwardly in response to the force resulting from the pressure differential. The diaphragm valve operates similarly to a helical spring. The diaphragm can be plastic or metal which indicates that the diaphragm is relatively thin.

Many expensive and sophisticated devises exist which relieve high pressure. Low pressures are defined here to be less than or equal to 100 psig. However, simple devices or valves for relieving low pressure are not readily available. Examples of fixed systems requiring low pressure venting are fuel and solvent storage tanks, large vessels anchored to foundations, small vessels attached to piping networks and piping networks all of which generally are part of an industrial or commercial process. Examples of movable systems requiring low pressure venting are casks, carboys and barrels containing various fluids having gas pressures or vapor pressures which could reach unsafe limits if the system is heated or agitated. It would be desirable to have a low cost, low pressure relief valve for relieving pressure in movable and fixed systems requiring low pressure venting.

SUMMARY OF THE INVENTION

A novel economical relief valve for relieving pressure in fixed and movable systems has now been discovered.

The relief valve for controlling pressure within a contained area comprises an elastomeric sheet having a bottom surface facing the contained area and an opposing top surface. The sheet has a plurality of slits continuous from the bottom surface through the top surface, separated by a plurality of posts of the sheet continuous from said bottom surface to said top surface, which form a plug having a bottom surface facing the contained area and an opposing top surface of at least the same surface area as the bottom surface area of the plug.

The slits are congruent with the perimeter of the upper and lower surface of the plug. In response to pressure exerted on the bottom surface of the plug, the plug lifts axially until upward pressure exerted on the bottom surface of the plug equals the downward pressure exerted on the plug by the posts. As the plug lifts, the pressure in the contained area is relieved and controlled. As the pressure is relieved, the plug lowers into its closed position and is fully closed when the upward pressure exerted on the bottom surface of the plug becomes less than the downward pressure exerted on the plug by the posts. The elastomeric sheet preferably has a thickness of not less than 0.3 cm. The valve is preferably slit so that the slits form a plug having a top surface area greater than the bottom surface area of the plug. The plug is preferably frustum-shaped and more preferably has only two slits and two posts.

A continuous gas-permeable, liquid-impermeable membrane which permits the passage of gas but not liquid from the bottom through the top surface of the membrane and is substantially coextensive with the elastomeric sheet may be adhered to the bottom surface of the elastomeric sheet, except for the bottom surface of the plug. This is possible because of the innovative physical design of the relief valve and its manner of operation.

The low pressure relief valve of this invention is efficient and effective for relieving pressure in fixed vessels and movable containers requiring low pressure venting.

The low pressure relief valve is created by making penetrations or slits in the elastomeric sheet in such a manner as to create a self-closing plug which is preferably tapered. The elastomeric sheet should be a flexible and resilient material. Rubber is an excellent elastomeric material, but many other elastomeric, rubber-like materials are suitable. Elastomeric material is defined here to include rubber. The slits in the elastomeric sheet are made so as to form thin posts, which as shown in FIG. 1 below are that portion of the elastomeric sheet directly between the ends of the slits and which hold the plug in place and provide the spring action necessary to close the plug after venting of the desired pressure. When the pressure builds up within the contained area, it exerts a force on the bottom surface of the plug and at a pressure, dependent on the type of elastomeric material, the thickness of the elastomeric sheet and the configurations of the slits and posts, the plug lifts axially. When the pressure decreases and thus the force on the bottom of the plug decreases, the posts bring the plug back into its closed position. The elastomeric material should be flexible so that the posts can stretch and the plug can move up and be resilient so that the posts will keep their spring action and not wear too quickly.

An advantage of the present invention is the ability to incorporate it into various gasket materials to create an in-line check valve. A check valve allows flow in one direction only. Since the subject invention can be incorporated into fairly thick gasket materials (thicknesses of at least 0.3 cm. are preferred) and does not rely on deflection of the gasket material to operate, it is particularly suited to this application. If the gasket material is too thin, deflection of the gasket can occur and create flow in the direction opposite of that desired in the event a greater pressure develops on the outlet side of the valve. The subject invention precludes this from occurring and provides positive closure under such circumstances. In fact, as the outlet pressure rises above the inlet pressure (as may occur in process lines connected to other systems), the valve closure gets tighter.

Venting would normally be done to atmospheric conditions but it is also possible to vent to another low pressure system. The bottom side of the plug may have a very small surface area in comparison to the top surface area of the plug. The opening or relief pressure of the plug is determined by the size and configuration of the plug and the flexibility, stiffness and thickness of the elastomeric materials. This provides for a broad range of potential venting pressures.

In movable systems, this invention takes advantage of existing elastomeric materials and safe venting of low pressures is accomplished by utilization of the low pressure relief valve of this invention. In the situation where it is necessary to contain liquids a continuous gas-permeable, liquid-impermeable material which allows the passage of gas but not liquids (for example "Gore-Tex"—a product manufactured by W. L. Gore & Associates, Inc., Newark, Del.) can be adhered to the bottom of the elastomeric material except for the bottom surface of the plug. The membrane would be adhered to the elastomeric material after the penetration is made. The membrane material is not sufficient in itself because it would continuously vent gases and therefore provide no back pressure control. For example if a carbonated beverage in a container was constantly vented it would lose its carbonation and taste flat. In fixed systems, proper venting of low pressure is easily accomplished by the use of a simple holder, which can be conveniently placed on the vessel, tank, or piping network. A disk of elastomeric material containing the plug is inserted in the holder, unless another convenient aperture exists on the system, such as a flange or threaded pipe connection. Since gases or vapors are generally vented from these type of systems and not liquids there is no need for the use of other materials such as the membrane material to eliminate the discharge of liquids through the valve.

BRIEF DESCRIPTION OF THE DRAWINGS

FIG. 1 is a top view of the low pressure relief valve.

FIG. 2 is a bottom view of the low pressure relief valve.

FIG. 3 is a cross sectional view of the low pressure relief valve along lines 3—3 in FIG. 1.

FIG. 4 is a perspective view of the low pressure relief valve as it could be used with a beer keg.

DETAILED DESCRIPTION OF DRAWINGS

Figure 5:
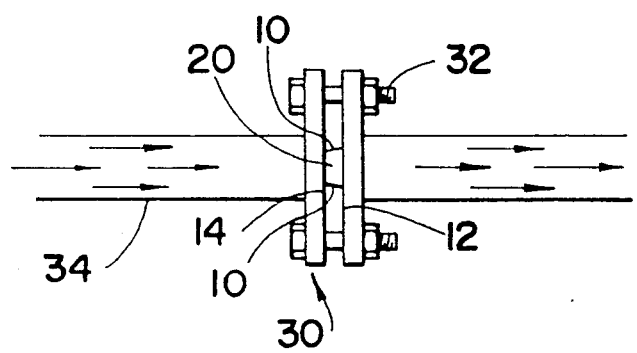
FIG. 5 is a perspective view of the low pressure relief valve as it could be used in a pipeline and as a check valve.

FIG. 1 is a top view which shows the slits 10 in the elastomeric sheet 12. The slits as shown in FIG. 1 are preferably made so as together to form plug 20 having a circular top surface. There can be a plurality of slits but preferably there should be two slits as shown in FIG. 1 and they would be separated by the posts 18 which are formed by the elastomeric sheet between the slits 10. The slits extend clear through the elastomeric sheet as can be seen below in FIG. 2 and the posts 18 and the plug 20 also extend through the elastomeric sheet from top to bottom. The slits 10 are congruent with the perimeter of the plug 20, both at the top and bottom of the plug.

Referring to FIG. 2, the bottom 14 of the elastomeric sheet is shown as are the slits 10, posts 18 and plug 20. The slits shown in FIG. 2 are correspondingly smaller than the slits shown in FIG. 1. The slits shown in FIG. 1 and 2 form a frustum-shaped plug that is tapered down from the top surface 12 to the bottom surface 14 of the elastomeric sheet. The posts 18 are also correspondingly smaller on the bottom surface than on the top surface. This is the preferred configuration of the relief valve of the present invention. Where it is not desired to have a tapered down plug, then the bottom surface would appear the same as the top surface as shown on FIG. 1 and the slits would be the same size on the top and the bottom as would the posts and the plug.

FIG. 3 is a cross sectional view of the relief valve of the present invention and shows the preferred tapered down plug 20. The thickness of the elastomeric sheet 22 can vary depending on the need for different relief pressures but preferably would not be less than 0.3 cm. Also shown in FIG. 3 is a membrane 28 which is coextensive with the bottom surface 14 of the elastomeric sheet 22.

Referring to FIG. 4, a beer keg 24 is shown with the top 26 of the beer keg 26 having the relief valve 22. The relief valve 22 forms part of the top surface 26 of the beer keg 24 and can be incorporated into the top surface in a variety of ways. It is important, however, than an air tight seal be formed between the relief valve 22 and the top 26 of the beer keg 24. As shown, the pressure in the beer keg would build, the plug 20 would lift slightly, allowing the pressure from within the beer keg to escape to the atmosphere, and when the pressure inside the beer keg decreased sufficiently, the plug 20 would lower back into its original closed position.

As can be seen in FIG. 1, 2 and 3, the posts are continuous from the elastomeric sheet through the plug 20 and hold the plug 20 in place and provide the spring action necessary to close the plug after venting at the desired pressures. The plug 20 when tapered from the top surface to the bottom surface of the plug 20 also acts as a check valve due to the fact that the surface area of the top surface is larger than the surface area of the bottom surface and thus any net pressure on the top surface pushes the plug 20 into the elastomeric sheet thus closing any openings between the elastomeric sheet and the plug 20.

An example of a fixed system where the check valve feature of the preferred valve of this invention could be used would be pipelines. The relief valve would be inserted in the pipeline 34 as shown in FIG. 5 so that the bottom surface 14 of the elastomeric sheet facing the contained area would face that side of the pipeline 34 from which pressure would need to be relieved and the top surface 12 of the valve would face the other side of the pipeline and act as an inline check valve. The relief valve would typically be held in place with a flange 30 and bolts for the flange 32 as shown in FIG. 5. The relief valve is centered in the flange such that the centerlines of the valve and the inside diameter of the pipeline are coincident. The connections are leakproof, since the function of the elastomeric material is typically to make a leakproof connection at the mating faces of the flange, when other devices (such as a control valve) are introduced into a pipeline. The valve can be designed to maintain backpressure and flow in the line.

The pipeline could be in any position from horizontal to vertical.

We claim:

1. A Relief valve for controlling pressure within a contained area comprising an elastomeric sheet having a bottom surface for facing the contained area and an opposing top surface, said sheet having a plurality of slits of an arc of a set radius, such that if the arc of said slits were continued along their radii, said slits would intersect at their ends, said slits continuous from said bottom surface through said top surface separated by a plurality of posts of said sheet continuous from said bottom surface of said top surface, forming a plug having a bottom surface for facing the contained area and an opposing top surface having a top surface area greater than the bottom surface area of the plug, said slits being congruent with the perimeter of the upper and lower surfaces of the plug.

2. A relief valve for controlling pressure within a contained area comprising an elastomeric sheet having a bottom surface for facing the contained area and an opposing top surface, said sheet having a plurality of sits of an arc of a set radius, such that if the arc of said slits were continued along their radii said slits would intersect at their ends, said slits continuous from said bottom surface through said top surface separated by a plurality of posts of said sheet continuous from said bottom surface to said top surface, forming a plug having a bottom surface for facing the contained area and an opposing top surface having a top surface area greater than the bottom surface area of the plug, so that in response to pressure exerted on the bottom surface of the plug, the plug lifts axially until the upward pressure exerted on the bottom surface of the plug equals the downward pressure exerted on the plug by the posts.

3. The valve of any of claims 1 or 2 wherein the elastomeric sheet is planar.

4. The valve of any of claims 1 or 2 wherein the elastomeric sheet has a thickness of not less than 0.3 cm.

5. The valve of claim 3 further comprising a continuous gas permeable, liquid-impermeable membrane having a top and bottom surface, said membrane being co-extensive with the elastomeric sheet and the top surface of said membrane being adhered to the bottom surface of said elastomeric sheet, except for the bottom surface of said plug.

6. The valve of any of claims 1 or 2 wherein the plug is frustum-shaped.

7. The valve of claim 6 further comprising a continuous gas permeable, liquid-impermeable membrane having a top and bottom surface, said membrane being co-extensive with the elastomeric sheet and the top surface of said membrane being adhered to the bottom surface of said elastomeric sheet, except for the bottom surface of said plug.

8. The valve of claim 7 wherein there are only two slits and two posts.

9. A method for relieving pressure in fixed and movable systems requiring low pressure venting comprising relieving pressure by use of a low pressure relief valve for controlling pressure within a contained area comprising an elastomeric sheet having a bottom surface facing the contained area and an opposing top surface, said sheet having a plurality of slits of an arc of a set radius, such that if the arc of said slits were continued along their radii, said slits would intersect at their ends, said slits continuous from said bottom surface through said top surface separated by a plurality of posts of said sheet continuous from said bottom surface to said top surface, forming a plug having a bottom surface facing the contained area and an opposing top surface having a greater surface area than the bottom surface area of the plug, wherein the slits form a plug having a top surface area greater than the bottom surface area of the plug with said slits being congruent with the perimeter of the upper and lower surfaces of the plug.

10. The method of claim 9 wherein the pressure relieved is less than 100 psig.

11. The method of claim 9 for relieving pressure in systems requiring low pressure venting, wherein the systems are pipelines, and whereby the relief valve relieves pressure from the side of the pipeline adjacent to the bottom of the relief valve and acts as a check valve preventing the flow or venting of gas or liquid from the side of the pipeline adjacent to the top of the relief valve to the side of the pipeline adjacent to the bottom of the relief valve.

12. The method of claim 9 wherein said elastomeric sheet is planar.

* * * * *